TOP ENTRY VALVE

Original Filed Aug. 8, 1966 2 Sheets-Sheet 1

INVENTOR
Donald R. Nelson
BY
Wolf, Greenfield & Hieken

TOP ENTRY VALVE

Original Filed Aug. 8, 1966 2 Sheets-Sheet 2

INVENTOR
Donald R. Nelson
BY
Wolf, Greenfield & Hicken

United States Patent Office

Re. 27,358
Reissued May 9, 1972

27,358
TOP ENTRY VALVE

Donald R. Nelson, Worcester, Mass., assignor to Goddard Industries, Inc., Worcester, Mass.

Original No. 3,471,122, dated Oct. 7, 1969, Ser. No. 570,920, Aug. 8, 1966. Application for reissue Nov. 18, 1970, Ser. No. 90,884

Int. Cl. F16k *3/12;* F16l *7/00*

U.S. Cl. 251—327 6 Claims

Matter enclosed in heavy brackets [ ] appears in the original patent but forms no part of this reissue specification; matter printed in italics indicates the additions made by reissue.

ABSTRACT OF THE DISCLOSURE

A cryogenic gate valve having a body with a full passage formed therein. A gate has opposed faces at an acute angle with recesses formed in the faces of the gate. A sealing means consisting primarily of a plastic O-ring, preferably having an L-shaped configuration, is positioned within the recesses. The sealing means is secured to the gate by a clamping element in the form of a disc positioned within the recess and engaging an inwardly extending flange of the sealing means and securing it directly to and in rigid, interengagement with the gate. Stress razors in the form of annular, sharpened, edges project from the bottom of the recess into the sealing means to prevent it from moving laterally when the gate valve is cooled.

The present invention relates to a valve construction. High performance valves and particularly those used at cryogenic temperatures require carefully fabricated gates and seats to assure proper closure of the valve without the likelihood of leakage. Because of the stringent requirements for such high performance valves, it is often necessary to have easy access to the gate and seats of the valve for repairs and other modifications. In constructions heretofore available, such repairs and modifications are difficult or expensive because of the inaccessibility of these components. The present invention overcomes such problems in a top entry gate valve.

A further object of this invention is to provide an improved top entry gate valve cryogenically insulated by a vacuum jacket which encapsulates the valve in a manner which permits access to the valve components without removal of the valve from the line. In such a construction the gate of the top entry valve is removable without destroying the vacuum jacket or without removing the body of the valve from the line.

A further object of this invention is to provide an improved top entry valve having a gate with removable seats and a body of a one piece construction in which separate end caps are eliminated.

A further object of this invention is to provide an improved top entry gate valve for cryogenic purposes in which specially formed angular cross sectioned deformable sealing members are carried by the gate and are adapted to engage the nondeformable seats.

These and other objects and advantages of the present invention will be more clearly understood when considered in conjunction with the accompanying drawings in which.

Figure 1:
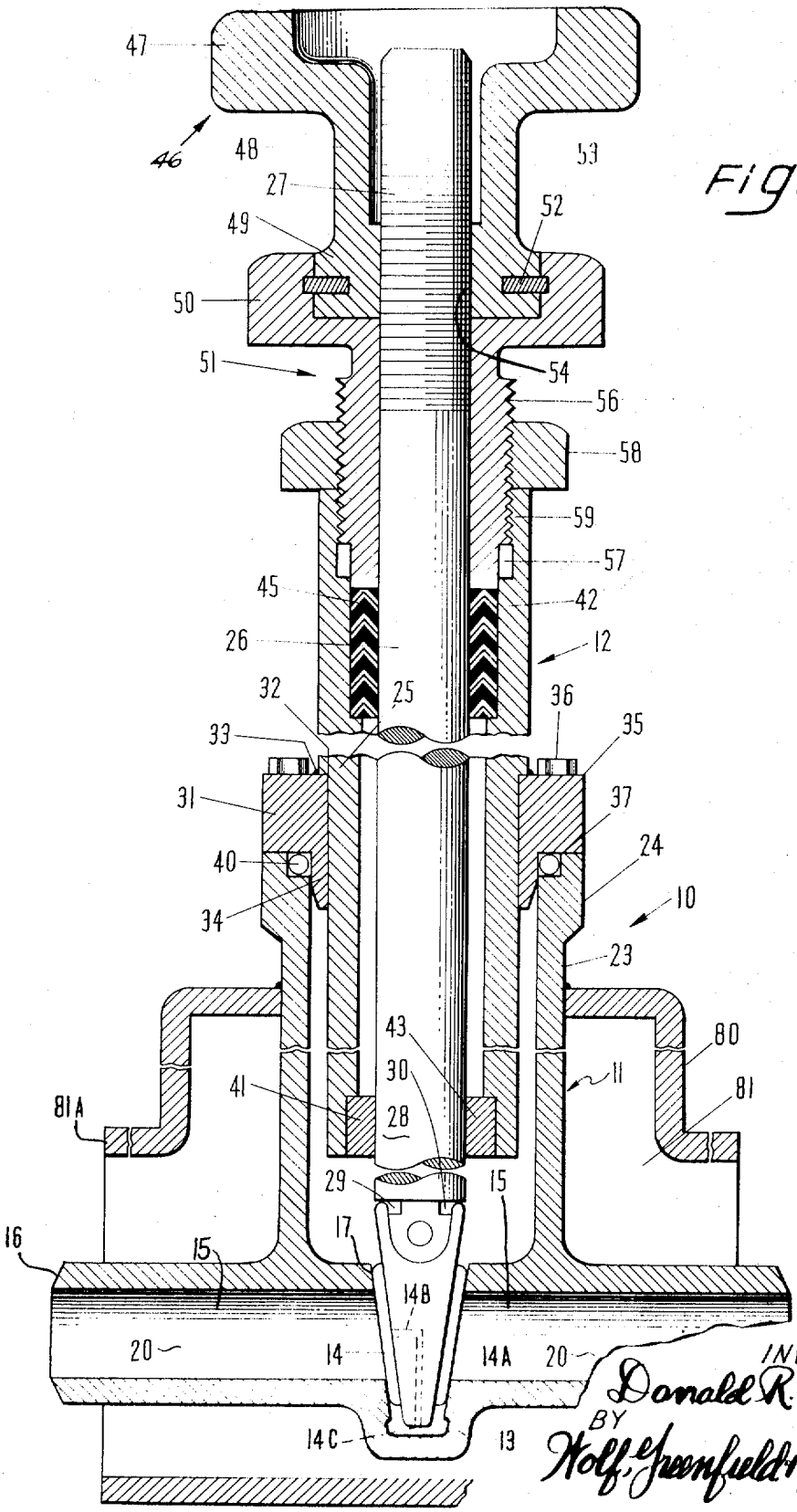
FIG. 1 illustrates a cross sectional vertical section of a valve and vacuum jacket embodying the invention.

Although the invention is described in an embodiment of a top entry valve in combination with a vacuum jacket for cryogenic purposes, it should be understood that this is illustrative only of a preferred use and that the invention may be embodied in other valve constructions whether jacketed or unjacketed in which top entry access to the gate is desirable.

The valve illustrated in the accompanying drawings includes a body member 10 having a body 11 and bonnet 12. Within the body 11 there is a chamber 13 which provides a flow passage through the body. The chamber 13 is shaped to receive a wedge or gate 14. Extending from the chamber 13 are aligned openings 15 formed by tubular extensions 20. These extensions are formed with ends 16 adapted to be butt welded to pipes of a system in which the valve is to be used. The inner ends of these tubular extensions are formed with annular planar metal seats 17 and 18 extending at an acute angle to one another. The tubular extensions are integrally cast with a cylindrical upper end 23. This cylindrical upper end 23 terminates at its upper end in a rectangularly shaped outwardly flared flange 24.

The bonnet 12 includes a stem tube 25 and a stem 26. The stem 26 is an elongated cylindrical member which is threaded at its upper end 27 and which extends well into the cylindrical upper end 23 of the body member 10 at its lower end 28. The wedge 14 is secured to the lower end 28 of the stem by suitable means such, for example, as a semispherical end and socket arrangement with the semispherical end 29 secured to the lower end 28 in a socket 30 formed in the upper end of wedge 14. The stem tube 25 through which the stem 26 extends, is secured to an upper opening in the cylindrical upper end 23 by a bonnet cap 31. The bonnet cap 31 is an annular flange through which the stem tube 25 projects. The cap 31 is closely fitted to a shoulder section 32 formed on the outer surface of the stem tube 25 intermediate its ends. The cap 31 and stem tube 25 are permanently secured together by welding these two elements together along the annular junction line 33. The cap 31 has an inner sleeve portion 34 which fits closely to the outer surface of the stem tube 25 and which extends between the stem tube and the cylindrical upper end 23. The outer or upper end 35 of the cap 31 is rectangular in shape and is preferably dimensioned to the shape and size of flange 24. The flange 24 and outer end 35 of the cap 31 are secured together by screws 36. The extreme upper end of the cylindrical end 23 is formed with a counterbore 37 within which is positioned a sealing ring 40 with the ring 40 effectively sealing the junction between the cylindrical upper end 23 and the ring 31.

The stem 26 is journaled in spaced relation to the stem tube 25 at its ends by suitable journaling means 41 and 42. Journaling means 41 comprises an annular ring which functions both as a bearing and as a restricting device. This ring 43 may be held in position by welding, force fit or by upsetting the bore formed on the inner surface at the lower end of the stem tube 25. The inner surface of the ring 43 is closely fit to and supports the stem 26 at its lower end. Preferably, as tight a fit as possible should be provided between the inner surface of the ring 43 and the stem 26 consistent with the ability to slide the stem 26 longitudinally with respect to the ring 43 on moving the handle controlling the stem 26, and without dislodging the ring 43 from the counterbore in the stem tube 25 at cryogenic or ambient temperatures.

Journaling means 42 comprises an annular packing of sealing material formed, for example, of Teflon. This packing may comprise a series of annular rings 45 having a cross-sectional configuration in the shape of a V so that longitudinal compression of the stacked rings 45 will exert a sealing pressure inwardly toward the stem 26. These packing rings 45 are positioned within a counterbore formed on the inner surface of the stem tube 25 near its upper end.

The handle construction generally illustrated at 46 comprises a hand grip 47, a continuous shank 48, and a lower outwardly flared flange 49. The flange 49 is positioned within a recess in the upper outwardly extending flange 50 of the sleeve member 51. The flange 49 is freely rotatable within the flange 50 and is secured in this flange against axial movement by a retaining ring 52 which extends radially from the flange 49 into a recess within flange 50. The shank 48 is formed with a longitudinally extending opening 53 which is threaded at its lower end 54. The threads in this lower end 57 of the sleeve member 51 have an outer diameter at the upper end slightly less than the inner diameter of the stem tube 25. The threads on the outer surface 56 engage the threads of lock nut 58 and threads formed on the walls of a second counterbore 59 at the upper end of stem tube 25. Sleeve member 51 is threaded into the upper member of stem tube 25 where it is held in tight engagement by the lock nut 58 with the lower end 57 of the sleeve member in pressing engagement with the packing rings 45. Rotation of the hand grip 47 causes axial movement of the stem 26 thereby causing wedge 14 to move to and from a sealing position between the seats 17.

The valve may be formed of a variety of material but preferably, and for purposes of economy, the body members should primarily be formed of brass while the stem and stem tube are preferably formed of a stainless steel. The seat members 17 and 18 are preferably formed of a metal or deformable plastic material. The hand grip 47 may be formed of plastic, such as nylon; and the packing rings 45 may be also formed of a plastic, such as Teflon.

Figures 2, 5, 6:
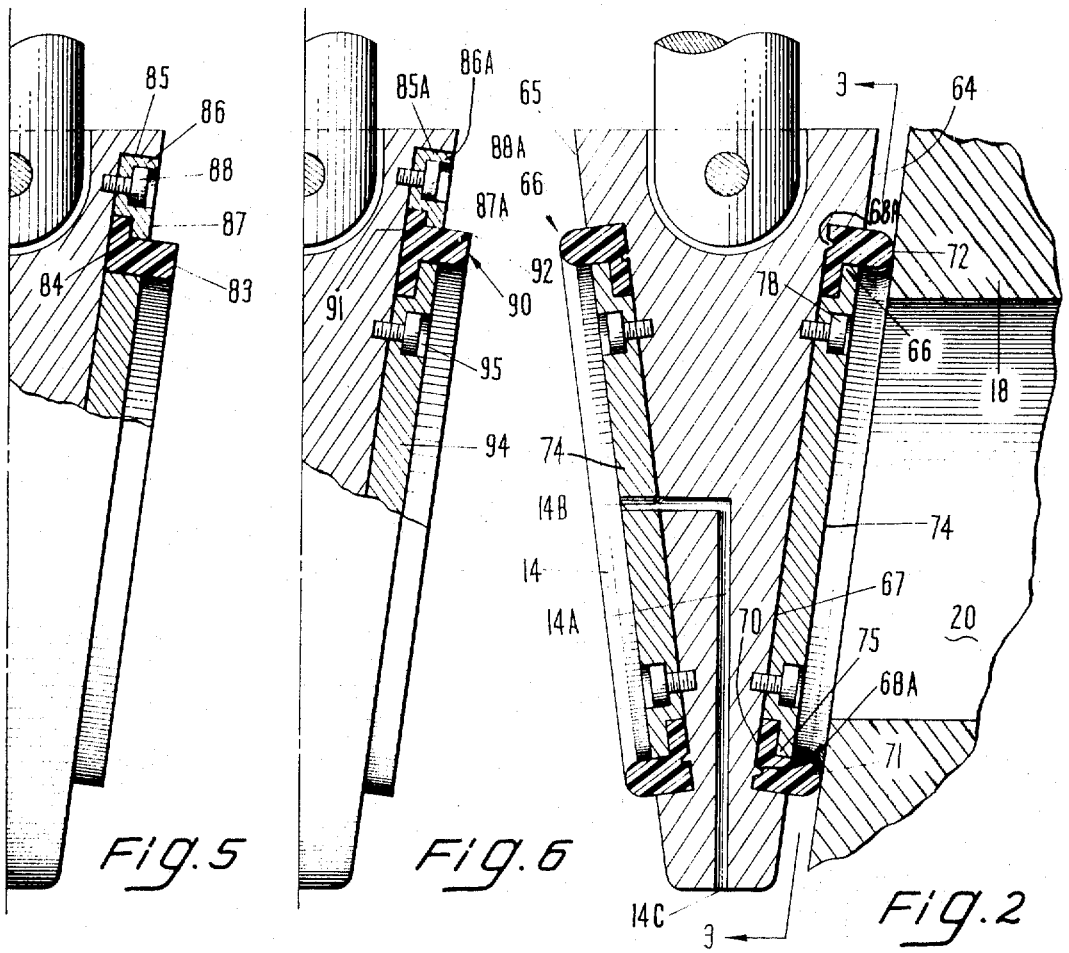
FIG. 2 is a cross sectional view of the gate elements of FIG. 1.
FIGS. 5 and 6 are cross sectional views of gates embodying modifications of the invention.
Figure 3:
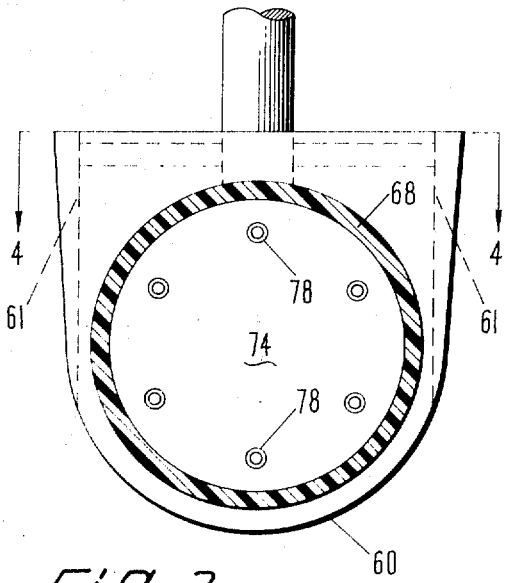
FIG. 3 is a cross sectional view taken along the line 3—3 of FIG. 2.
Figure 4:
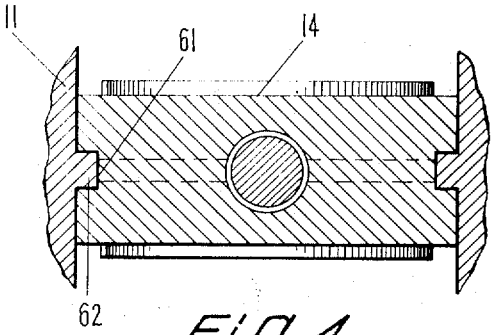
FIG. 4 is a cross sectional view taken along the line 4—4 of FIG. 3.

Reference is again made to the construction of the gate and seat as illustrated in greater detail in FIG. 2. The gate 14 is generally wedge shaped in a front to rear cross section, as illustrated in FIG. 2. The sides of this wedge or gate 14 are tapered from a wide upper end downwardly to an arcuate lower end 60 as viewed in FIG. 3. The side walls may be channeled at 61 to receive projecting rails or guides 62 formed in the body 11 to guide the gate in reciprocating vertical movement. Other suitable guide means may be used.

One or both opposite faces 64 and 65 of the gate 14 may be formed with sealing means generally illustrated at 66. In each sealing means, the face 64 and/or 65 of the wedge is formed with a circular depression 67. Positioned within this depression which has a diameter greater than the diameter of the openings 15, is a seat 68 in the form of an annular, preferably plastic, seating member. In the preferred embodiment, this seat may be formed of a suitable plastic such as Kel-F, having an L-shaped cross sectional configuration with a base flange 70, and outwardly extending flange 71, continuous with one another. The base flange 70 fits against the bottom of the depression 67 while the flange 61 fits closely against the side walls of the depression 67. The outer edge 72 of flange 71 is preferably curved and is deformable upon engagement with the seat 18. The seat 68 is secured within the depression 67 by suitable means such, for example, as the metal disc 74. This disc has a periphery 75 that conforms with the inner periphery of the seat and is provided with a stepped periphery of the seat and is provided with a stepped portion adapted to engage flange 70. The inner face of the disc 75 lies in facing relation with the bottom of the depression 67 while the outer surface of the disc 74 lies within the cylindrical like chamber formed by the annular flange 71. The metal disc 74 is secured to the wedge 14 by a plurality of cap screws 78 which project through counterbores in the metal disc 74 into the wedge 14. These cap screws or bolts preferably are designed to contract at a greater rate than the metal disc 74 or plastic seat 68 as the temperature is lowered thereby assuring a solid contact at all cryogenic temperatures at which this valve may be operated. Stress razors 68A integrally formed as annular projections from the bottom of depression 67 bite into and secure the seat 68. The wedge 14 is provided with a venting passage 14A having one end 14B extending through metal disc 74 and communicating with one opening 15 and the other end 14C communicating with chamber 13.

Surrounding the valve construction and its associate components is a vacuum jacket 80 designed to cryogenically insulate the valve mechanism. This vacuum jacket 80 may take any suitable form in which a chamber 81 is formed within the jacket 80 surrounding the valve and its components. This insulating jacket is suitably sealed to a vacuum system by butt welding annular ends 81A to corresponding ends of parts in such a vacuum system.

The gate and seat construction illustrated in FIG. 2 may be modified in a variety of construction such as is illustrated in FIGS. 5 and 6. In FIG. 5 the seat 83 has an L-shaped configuration with the base flange 84 extending outwardly instead of inwardly as illustrated in FIG. 2. This seat is positioned within an annular depression 85 in the wedge 14 and is secured in this annular channel by an annular ring 86 having a lip 87 engaging the flange 84. The ring 86 is secured to the wedge by radially arranged cap screws 88 that extend through a counterbore in the ring 86 into the wedge 14.

A further modification is illustrated in FIG. 6 in which the seat 90 has a substantially T-shaped configuration with the base flange 91 extending laterally on either side of the projecting flange 92. The base flange 91 lies in face to face relation with the bottom of a circular depression formed in the wedge 14 and is secured in this position on the inside by a metal disc or plate 94 having a periphery conforming with the inner periphery of the seat 90. The metal plate or disc 94 is secured to the wedge 14 by cap screws 95 positioned in counterbores in the metal disc or plate 94 and extending into the wedge 14. An annular ring 86A having a lip 87A engages the outer periphery of base flange 91. The ring 86A is secured to the wedge by radially arranged cap screws 88A that extend through the counterbore in the ring 86A into wedge 14.

What is claimed is:

1. A cryogenic gate valve having a body with a flow passage formed therein, gate-receiving means comprising a pair of aligned seat members with facing, annular surfaces lying in planes at an acute angle to one another, [a recess within at least one of said faces adapted to receive a sealing means,]

a gate having opposed faces lying at an acute angle to one another, *a recess within at least one of said faces adapted to receive a sealing means,* a sealing means for at least one of said faces positioned within and projecting from one of said recesses, said sealing means formed entirely of a material deformable at ambient temperatures, said sealing means comprising an annular flange projecting from said one face of said gate and positioned to be uniformly engaged by said annular surfaces of one of said seat members, said flange projecting on one side from said one face, and means rigidly securing said annular flange to said gate against movement relative thereto including annular means forming a projection in said recess and biting into the surface of said sealing means on the side thereof opposite said annular surface of said one seat member.

2. A cryogenic gate valve as set forth in claim 1 wherein said means rigidly securing said annular flange includes a clamp positioned in said recess and engaging portions of said sealing means.

3. A cryogenic gate valve as set forth in claim 2 wherein said sealing means includes a second annular flange extending angularly from said first annular flange and said clamp engages said second annular flange.

4. A cryogenic gate valve as set forth in claim 3 wherein said second annular flange extends inwardly providing an L-shaped cross section to said sealing means, and said clamp comprises a disc positioned within said first annular flange with a periphery of said disc overlying and clamping said second annular flange to said gate.

5. A cryogenic valve as set forth in claim 3 wherein said second annular flange extends laterally on both sides of said first flange providing said sealing means with a T-shaped cross section, an annular clamping ring, coaxial with said first flange positioned within said recess and engaging the outwardly extending edge of said second annular flange, and said clamp comprises a disc positioned within said first flange and partially overlying and engaging the inwardly extending edge of said second flange.

6. A cryogenic gate valve as set forth in claim 1 wherein said projection comprises a stress razor having an annular configuration.

References Cited

The following references, cited by the Examiner, are of record in the patented file of this patent or the original patent.

UNITED STATES PATENTS

| | | | |
|---|---|---|---|
| 587,439 | 8/1897 | Jenkins | 251—327 |
| 1,896,944 | 2/1933 | Esnard | 251—357 X |
| 2,194,261 | 3/1940 | Allen | 251—328 |
| 3,000,610 | 6/1961 | Bryant | 251—328 X |
| 3,050,077 | 8/1962 | Wheatley | 251—328 X |
| 3,085,784 | 4/1963 | Dumm | 251—327 X |
| 3,167,088 | 1/1965 | McInerney | 137—375 |
| 3,315,700 | 4/1967 | Greenwood | 137—375 |

HENRY T. KLINKSIEK, Primary Examiner

U.S. Cl. X.R.

137—375